US012786620B2

(12) United States Patent
OConnor et al.

(10) Patent No.: US 12,786,620 B2
(45) Date of Patent: Nov. 3, 2026

(54) SINGLE SURFACE DIRECTIONAL SOUND SYSTEM HAVING MULTIPLE GLASS SPEAKERS

(71) Applicant: GM Global Technology Operations LLC, Detroit, MI (US)

(72) Inventors: Joshua Paul OConnor, Commerce, MI (US); Bo Yang, Rochester Hills, MI (US); David Richard Baehr, Clinton Township, MI (US); Lee Hiltunen, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 201 days.

(21) Appl. No.: 18/971,637

(22) Filed: Dec. 6, 2024

(65) Prior Publication Data

US 2026/0164173 A1 Jun. 11, 2026

(51) Int. Cl.

| | |
|---|---|
| ***H04R 25/00*** | (2006.01) |
| ***H04R 1/34*** | (2006.01) |
| ***H04R 1/40*** | (2006.01) |
| ***H04R 7/12*** | (2006.01) |
| ***H04R 17/00*** | (2006.01) |

(52) U.S. Cl.

CPC ............ *H04R 1/345* (2013.01); *H04R 1/403* (2013.01); *H04R 7/12* (2013.01); *H04R 17/00* (2013.01); *H04R 2201/401* (2013.01); *H04R 2307/023* (2013.01); *H04R 2499/13* (2013.01)

(58) Field of Classification Search

CPC ........ H04R 1/345; H04R 1/403; H04R 17/00; H04R 2201/401; H04R 2307/023; H04R 2499/13; H04R 7/12; H04R 1/025; H04R 2440/05; H04R 7/06

USPC .......................................................... 381/386

See application file for complete search history.

(56) References Cited

U.S. PATENT DOCUMENTS

| | | | | |
|---|---|---|---|---|
| 6,324,294 | B1 * | 11/2001 | Azima ..................... | H04R 1/24 381/381 |
| 6,510,919 | B1 | 1/2003 | Roy et al. | |
| 2022/0396207 | A1 | 12/2022 | Cannon | |

FOREIGN PATENT DOCUMENTS

| | | | |
|---|---|---|---|
| DE | 102020123100 | A1 | 3/2021 |
| DE | 102023123582 | A1 | 3/2024 |
| WO | 2004107806 | A1 | 12/2004 |
| WO | 2024070584 | A1 | 4/2024 |

* cited by examiner

*Primary Examiner* — Phylesha Dabney

(74) *Attorney, Agent, or Firm* — Vivacqua Crane, PLLC

(57) ABSTRACT

A directional sound system includes a base member with at least one pane element fixed to the base member. The base member includes a base surface. An exciter is fixed to the at least one pane element and includes an exciter surface. An adhesive isolation ring is applied between the at least one pane element and the base member. A predetermined thickness of the adhesive isolation ring creates a gap between the base surface of the base member and the exciter surface. The at least one pane element is positioned on the base surface of the base member. The exciter when energized generates a directional signal.

20 Claims, 3 Drawing Sheets

SINGLE SURFACE DIRECTIONAL SOUND SYSTEM HAVING MULTIPLE GLASS SPEAKERS

INTRODUCTION

The present disclosure relates to sound generation systems.

During vehicle driving a sound system is commonly operated for operator entertainment. Sound systems for vehicle installation may include speakers which are mounted within items including a dashboard, a door panel and a seat headrest. Speaker installation may include the ability to direct sound based on the location of the speaker or speakers positioned in the dashboard, the door panel and the seat headrest.

While current systems and methods to provide entertainment sound during vehicle operation achieve their intended purpose, there is a need for a new and improved system and method to create directional sound from a sound system.

SUMMARY

According to several aspects, a directional sound system includes a base member with at least one pane element fixed to the base member. The base member includes a base surface. An exciter fixed to the at least one pane element includes an exciter surface. An adhesive isolation ring is applied between the at least one pane element and the base member. A predetermined thickness of the adhesive isolation ring creates a gap between the base surface of the base member and the exciter surface. The at least one pane element is positioned on the base surface of the base member. The exciter when energized generates a directional signal.

In another aspect of the present disclosure, the exciter defines a piezo member energized to actuate the base member.

In another aspect of the present disclosure, the base member defines a glass base.

In another aspect of the present disclosure, an adhesive fixes the exciter to the at least one pane element.

In another aspect of the present disclosure, the adhesive defines a double-sided tape.

In another aspect of the present disclosure, the adhesive isolation ring defines a urethane adhesive.

In another aspect of the present disclosure, the adhesive isolation ring defines an isolator to decouple an exciter actuation from the base surface.

In another aspect of the present disclosure, power is provided to the exciter using multiple wires from an external power source.

In another aspect of the present disclosure, the wires are positioned beneath the at least one pane element and above the base surface.

In another aspect of the present disclosure, the exciter is embedded in the at least one pane element, the exciter being positioned coplanar with an inward facing surface directed toward the base surface, with the adhesive isolation ring positioned immediately abutting an outward facing edge of the pane element.

According to several aspects, a vehicle directional sound system includes a base member of a vehicle window. The base member includes a base surface. Multiple pane elements are adhesively bonded to the base surface of the base member. Multiple exciters are individually fixed to individual ones of the multiple pane elements and individually include an exciter surface. Multiple adhesive isolation rings are individually applied between individual ones of the multiple pane elements and the base member. A predetermined thickness of the multiple adhesive isolation rings creates a gap between the base surface of the base member and the exciter surface of the multiple exciters. The multiple pane elements are selectively positioned on the base surface of the base member. The exciters when energized generate a directional signal.

In another aspect of the present disclosure, the pane elements have an outwardly curved shape defining a convex surface.

In another aspect of the present disclosure, the multiple adhesive isolation rings individually define a continuous border around individual ones of the multiple exciters and thereby create a seal around the individual ones of the multiple exciters.

In another aspect of the present disclosure, the adhesive isolation rings individually define a discontinuous border around individual ones of the multiple exciters.

In another aspect of the present disclosure, the adhesive isolation rings act as an isolator to decouple exciter actuation from the base surface.

In another aspect of the present disclosure, the pane elements include a reduced thickness immediately abutting the adhesive isolation rings to reduce a pane element vibration.

In another aspect of the present disclosure, the multiple exciters are individually embedded in individual ones of the multiple pane elements, and the wires are positioned between the base surface and the multiple pane elements.

According to several aspects, a method for generating directional sound comprises: providing a base member; selecting a predefined shape of multiple pane elements; individually fixing one of multiple exciters to individual ones of the multiple pane elements; individually applying one of multiple adhesive isolation rings between the individual ones of the multiple pane elements and the base member to adhesively bond the multiple pane elements to a base surface of the base member; creating a gap between the base surface of the base member and an exciter surface of individual ones of the multiple exciters when applying the multiple adhesive isolation rings by maintaining the multiple adhesive isolation rings at a predetermined thickness; and energizing the multiple exciters from a power source to generate a directional signal from the multiple pane elements.

In another aspect of the present disclosure, the method further includes: providing power to the multiple exciters using multiple wires from an external power source; and positioning the wires between the base surface and the multiple pane elements.

In another aspect of the present disclosure, the method further includes selecting the multiple exciters as individual piezo members which when energized actuate the base member.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
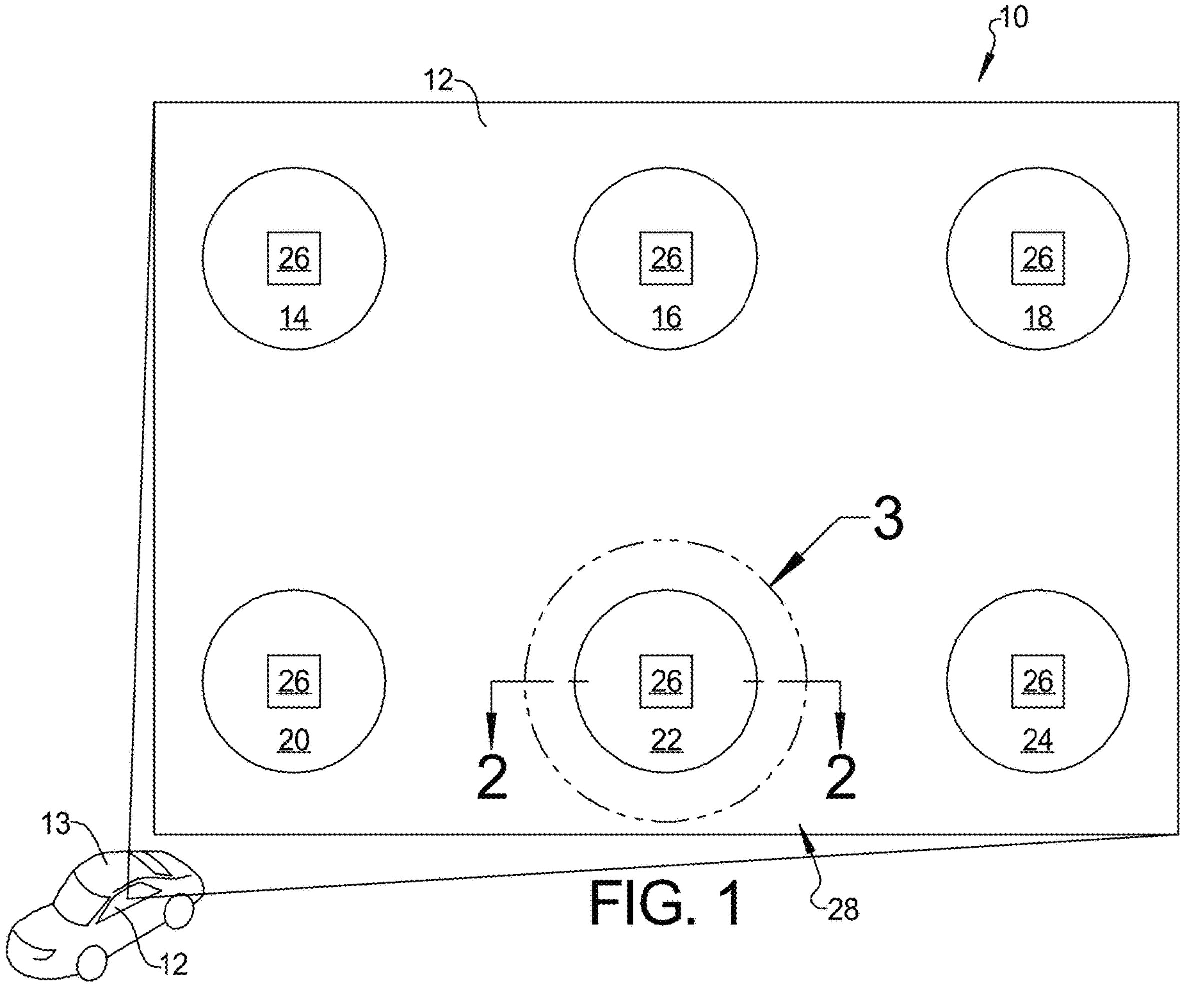
FIG. 1 is a top plan view of a directional sound system according to an exemplary aspect.

Referring to FIG. 1, a directional sound system 10 includes a base member 12 such as a glass base, a metal base or a rigid surface base which may for example define a vehicle window of a vehicle 13, with at least one and according to several aspects multiple pane elements 14, 16, 18, 20, 22 and 24 bonded to the base member 12. According to several aspects, the vehicle 13 may define any type of vehicle including but not limited to an automobile such as a sedan, a sport utility vehicle, a van, a truck, a battery electric vehicle and a hybrid vehicle. According to several aspects, the pane elements 14, 16, 18, 20, 22 and 24 may be formed of a glass material or a similar material including a polycarbonate material. The pane elements 14, 16, 18, 20, 22 and 24 individually include an exciter 26 which according to several aspects may define a piezo member which when energized actuates the base member 12. The multiple pane elements 14, 16, 18, 20, 22 and 24 may be positioned on a base surface 28 of the base member 12 to cause the directional sound system 10 to function as a zoned audio system providing a directional signal defining multiple individual zones.

Referring to FIG. 2 and again to FIG. 1, an adhesive 30 such as a double-sided tape attaches the exciter 26 to individual ones of the multiple pane elements 14, 16, 18, 20, 22 and 24 including to the exemplary pane element 22 shown. An adhesive isolation ring 32 such as a urethane adhesive is then applied between individual ones of the multiple pane elements 14, 16, 18, 20, 22 and 24 including the exemplary pane element 22 shown and the base member 12, to attach the multiple pane elements 14, 16, 18, 20, 22 and 24 to the base member 12, which assists in generation of directional sound. A predetermined thickness 34 of the adhesive isolation ring 32 creates a void or gap 36 between a base surface 38 and an exciter surface 40 of the exciter 26 on each pane element such as the pane element 22. According to several aspects the predetermined thickness 34 and therefore the gap 36 is approximately 0.8 mm minimum. The adhesive isolation ring 32 also acts as an isolator to decouple exciter 26 actuation from the base surface 38.

Figure 2:
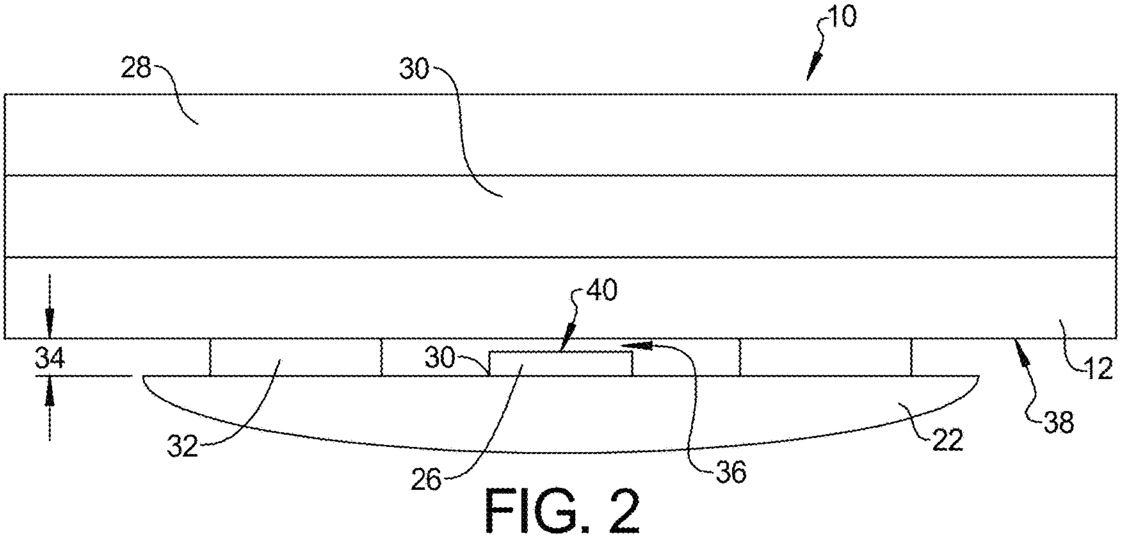
FIG. 2 is a cross-sectional side elevational view taken at section 2 of FIG. 1.

Referring to FIG. 3 and again to FIGS. 1 through 2, power is provided to individual exciters 26 using multiple wires 42. Power is provided to the wires 42 from an external power source 44. The wires 42 may be positioned between the multiple pane elements 14, 16, 18, 20, 22 and 24 such as the exemplary pane element 22 shown and the base surface 38.

Figure 3:
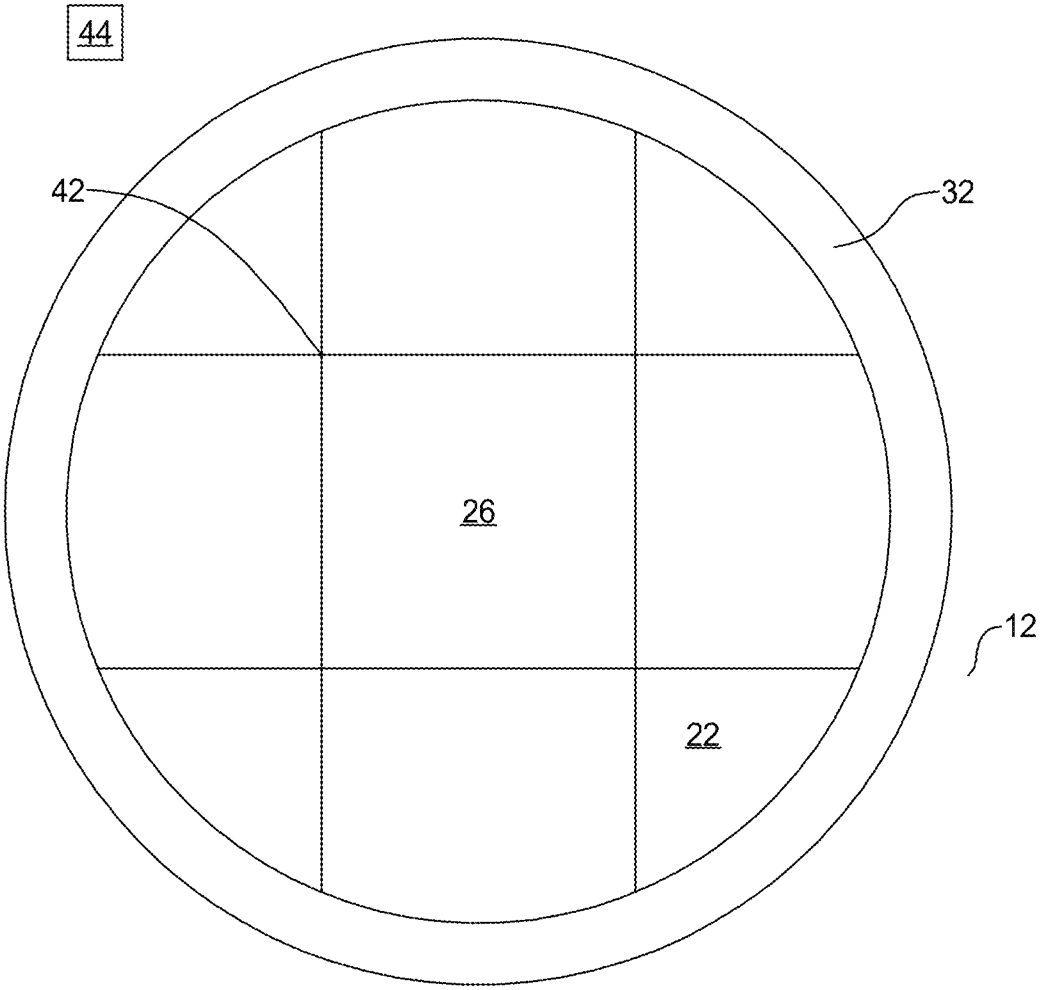
FIG. 3 is a top plan view of area 3 of FIG. 1.
Figure 4:
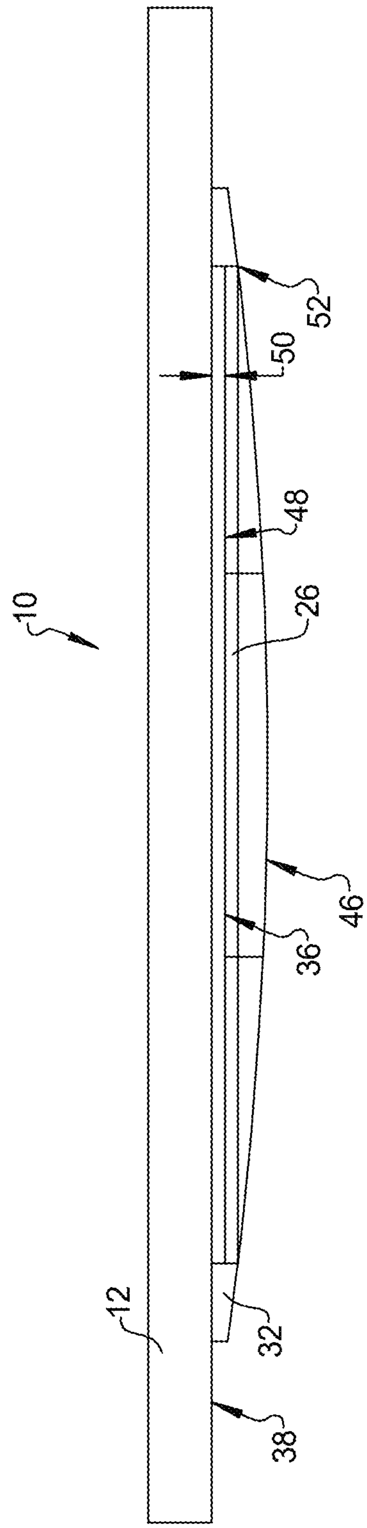
FIG. 4 is a cross-sectional side elevational view similar to FIG. 2 of another aspect of the directional sound system.

Referring to FIG. 4 and again to FIGS. 1 through 3, according to several aspects in lieu of the exciter 26 being attached to a surface of the pane element, the exciter 26 may be embedded in the multiple pane elements 14, 16, 18, 20, 22 and 24 such as the exemplary pane element 22 shown. According to several aspects, the pane elements such as the exemplary pane element 22 may have an outwardly curved shape such as a convex surface 46. The exciter 26 may be positioned coplanar with an inward facing surface 48 directed toward the base surface 38 of the exemplary pane element 22. In the embedded position of the exciter 26, a secondary gap 50 similar to the gap 36 shown and described in reference to FIG. 2 is created between an entirety of the inward facing surface 48 and the base surface 38, with the adhesive isolation ring 32 positioned immediately abutting an outward facing edge 52 of the pane element such as the pane element 22.

The directional sound system 10 includes an exciter such as a piezo exciter attached to a pane element using an adhesive. The pane element is attached to a surface of a base member using an adhesive isolation ring with the exciter facing the surface of the base member. The adhesive isolation ring has a predetermined thickness spacing the exciter from the surface of the base member which thereby creates an air gap between the exciter and the surface of the base member to decouple the exciter from the base member. The exciter when energized actuates the glass and generates directional sound. The adhesive isolation ring also acts as an acoustic isolator to decouple exciter actuation from the base surface. Exciter power supply wires are directed under the adhesive isolation ring and attach with ribbon wire to an external power source to energize the exciter.

The directional sound system 10 defines a glass speaker that consists of three (3) components, (1) a pane element or diaphragm, (2) an exciter and wiring, and (3) an adhesive isolation ring. The pane element may be concave-shaped at an element center to permit the adhesive isolation ring and the exciter to be embedded in the element to reduce an overall assembly thickness. The pane element may also be round, oval, square, rectangular or have other shapes. The pane element may be curved and may have a reduced thickness immediately abutting the adhesive isolation ring to reduce element vibration. The exciter may have multiple shapes including square, round or ring-shaped or other shapes. The pane element is attached to a base surface by an adhesive isolation ring. The adhesive isolation ring may be continuous, dashed or have other shapes. The adhesive isolation ring may also be a structural glue or a sandwich. The adhesive isolation ring isolates a vibration of the pane element to the base surface generated when the exciter is energized. Any or all of the three (3) components of the speaker may be made of a transparent material or may be made of a translucent material to improve the aesthetics of the design.

A directional sound system 10 of the present disclosure offers several advantages. These include: a pane element is actuated to create sound with the attachment via an adhesive isolation ring applied to a base surface that serves to isolate pane element vibration, thereby yielding a directional sound. The pane element with the exciter is attached by the adhesive isolation ring having a predetermined thickness, and a pane element geometry enhances directional sound and reduces packaging space. Individual pane elements serve as a speaker cone that may be placed at multiple locations on a base surface such that the multiple pane elements collectively generate a directional signal. The pane elements provide localization of sound at each pane element location to provide individual audio experiences for each zone.

The pane elements individually have a bonded exciter attached to the pane elements using an adhesive. The pane elements are individually fixed to a base member with an adhesive isolation ring and generate directional sound when the exciter is energized. The adhesive isolation ring used to attach the pane elements creates a void between the base surface and individual exciters on the pane elements. The adhesive isolation ring also acts as an isolator to decouple exciter actuation from the base surface. An exciter wire is directed under the adhesive isolation ring and is attached for example with a ribbon wire to an external power source. One or more wire leads may also be taped down in an adhesive path similar to typical fixed glass electronics. The wire leads may be soldered to the exciter of individual pane elements thereby defining multiple actuators.

In a controlled environment individual actuators are not required to be sealed, however the adhesive isolator ring if applied circumferentially may act as a seal. According to several aspects the adhesive isolation rings individually define a continuous border around individual ones of the multiple exciters and thereby create a seal around the individual ones of the multiple exciters. According to several aspects the adhesive isolation rings individually define a discontinuous border around individual ones of the multiple exciters. Multiple pane elements may be placed on the base surface to create a zoned audio system providing a directional signal for listeners. The directional signal is created by an orientation and a quantity of the multiple pane elements.

What is claimed is:

1. A directional sound system, comprising:

a base member with at least one pane element fixed to the base member, the base member having a base surface;

an exciter fixed to the at least one pane element and having an exciter surface;

an adhesive isolation ring applied between the at least one pane element and the base member, a predetermined thickness of the adhesive isolation ring creating a gap between the base surface of the base member and the exciter surface; and the at least one pane element is positioned on the base surface of the base member, the exciter when energized generating a directional signal.

2. The directional sound system of claim 1, wherein the exciter defines a piezo member energized to actuate the base member.

3. The directional sound system of claim 2, wherein the base member defines a glass member.

4. The directional sound system of claim 1, further including an adhesive fixing the exciter to the at least one pane element.

5. The directional sound system of claim 4, wherein the adhesive defines a double-sided tape.

6. The directional sound system of claim 1, wherein the adhesive isolation ring defines a urethane adhesive.

7. The directional sound system of claim 1, wherein the adhesive isolation ring defines an isolator to decouple an exciter actuation from the base surface.

8. The directional sound system of claim 1, including multiple wires from an external power source provide power to the exciter.

9. The directional sound system of claim 8, wherein the wires are positioned beneath the at least one pane element and above the base surface.

10. The directional sound system of claim 1, wherein the exciter is embedded in the at least one pane element, and the exciter is positioned coplanar with an inward facing surface directed toward the base surface, with the adhesive isolation ring positioned immediately abutting an outward facing edge of the at least one pane element.

11. A vehicle directional sound system, comprising:

a base member of a vehicle window, the base member having a base surface;

multiple pane elements adhesively bonded to the base surface of the base member;

multiple exciters individually fixed to individual ones of the multiple pane elements and individually including an exciter surface;

multiple adhesive isolation rings individually applied between individual ones of the multiple pane elements and the base member, a predetermined thickness of the multiple adhesive isolation rings creating a gap between the base surface of the base member and the exciter surface of the multiple exciters;

the multiple pane elements being selectively positioned on the base surface of the base member; and the exciter when energized generating a directional signal.

12. The vehicle directional sound system of claim 11, wherein the pane elements have an outwardly curved shape defining a convex surface.

13. The vehicle directional sound system of claim 11, wherein the multiple adhesive isolation rings individually define a continuous border around individual ones of the multiple exciters and thereby create a seal around the individual ones of the multiple exciters.

14. The vehicle directional sound system of claim 11, wherein the adhesive isolation rings individually define a discontinuous border around individual ones of the multiple exciters.

15. The vehicle directional sound system of claim 11, wherein the adhesive isolation rings act as an isolator to decouple exciter actuation from the base surface.

16. The vehicle directional sound system of claim 11, wherein the pane elements include a reduced thickness immediately abutting the adhesive isolation rings to reduce a pane element vibration.

17. The vehicle directional sound system of claim 11, wherein the multiple exciters are individually embedded in individual ones of the multiple pane elements, and the multiple exciters are individually positioned coplanar with an inward facing surface directed toward the base surface.

18. A method for generating directional sound, comprising:

providing a base member;

selecting a predefined shape of multiple pane elements;

individually fixing one of multiple exciters to individual ones of the multiple pane elements;

individually applying one of multiple adhesive isolation rings between the individual ones of the multiple pane elements and the base member to adhesively bond the multiple pane elements to a base surface of the base member;

creating a gap between the base surface of the base member and an exciter surface of individual ones of the multiple exciters when applying the multiple adhesive isolation rings by maintaining the multiple adhesive isolation rings at a predetermined thickness; and energizing the multiple exciters from a power source to generate a directional signal from the multiple pane elements.

19. The method of claim 18, further including:

providing power to the multiple exciters using multiple wires from an external power source; and positioning the wires between the base surface and the multiple pane elements.

20. The method of claim 18, further including selecting the multiple exciters as individual piezo members which when energized actuate the base member.

* * * * *